No. 688,310. Patented Dec. 10, 1901.
W. H. JAKWAY.
APPARATUS FOR LOCATING FOREIGN SUBSTANCES IN BODIES.
(Application filed Mar. 9, 1901.)
(No Model.)
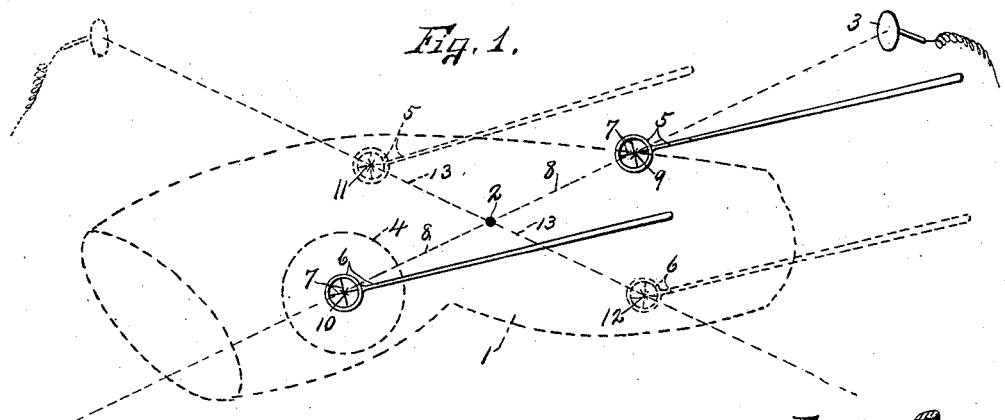
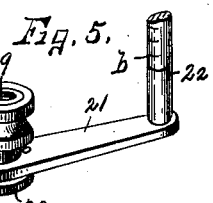
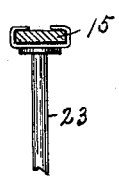
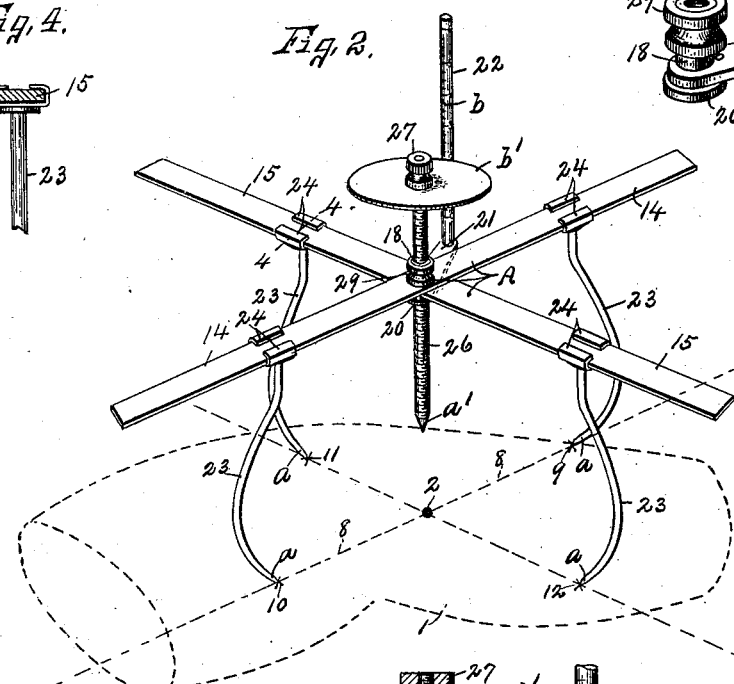
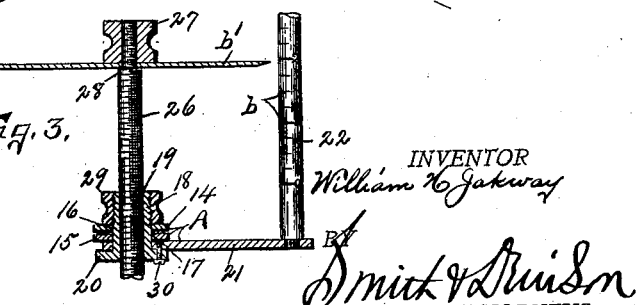
WITNESSES:
INVENTOR
William H. Jakway
ATTORNEYS.

UNITED STATES PATENT OFFICE.

WILLIAM H. JAKWAY, OF SYRACUSE, NEW YORK.

APPARATUS FOR LOCATING FOREIGN SUBSTANCES IN BODIES.

SPECIFICATION forming part of Letters Patent No. 688,310, dated December 10, 1901.

Application filed March 9, 1901. Serial No. 50,411. (No model.)

*To all whom it may concern:*

Be it known that I, WILLIAM H. JAKWAY, of Syracuse, in the county of Onondaga, in the State of New York, have invented new and useful Improvements in Apparatus for Locating Foreign Substances in Bodies, of which the following, taken in connection with the accompanying drawings, is a full, clear, and exact description.

My invention relates to improvements in apparatus for locating foreign substances in bodies, and is particularly applicable for use in connection with X-ray machines.

The object of this invention is to provide a simple and practical means whereby a surgeon or other operator may readily locate the position and depth beneath the surface of a bullet or other foreign substance in any part of the body, so that the operator may make the necessary incisions for removing the foreign substance with accuracy and precision and without undue mutilation of the flesh adjacent to the foreign substance.

To this end the invention consists in the construction, combination, and arrangement of the parts of an apparatus for the purpose referred to, as hereinafter fully described, and pointed out in the claims.

Referring to the drawings, Figure 1 is a perspective view of a portion of a body, as one of the limbs, in which the foreign substance is lodged and the mechanism used in connection with the X-ray machine for establishing intersecting lines in which the foreign object or substance forms the point of intersection of said lines. Fig. 2 is a perspective view of my invention, showing its application to the body having the foreign substance lodged therein. Fig. 3 is a transverse vertical sectional view through the intersecting bars, showing the upper end of the adjusting-screw, the graduated index, and the indicator mounted on the screw. Fig. 4 is a vertical sectional view on line 4 4, Fig. 2. Fig. 5 is a perspective view of the detached movable head carrying the intersecting arms and the graduated index.

Similar reference characters indicate corresponding parts in all the views.

In Fig. 1 I have shown a portion of a body, as a limb 1, having a foreign substance—as a bullet, for example—2, lodged therein. In this figure I have also shown, diagrammatically, an X-ray device 3 and a fluorescent screen 4, which are usually employed for locating any foreign substance in a body, the device 3 and screen 4 being arranged at opposite sides of the body in the usual manner. Suitable frames 5 and 6, having cross-wires 7, are interposed, respectively, between the X-ray device 3 on one side of the body and between the screen and the opposite side of the body for concentrating the rays in a direct or straight line 8, and passing through the intersecting points of the cross-wires 7. These cross-wires are held in close proximity to the surface of the body, and suitable marks 9 and 10 are then made upon the opposite surfaces of the body at the points of intersection of the cross-wires 7. After these points have been established in one straight line passing through the foreign object the X-ray machine and fluorescent screen, as well as the frames 5 and 6, are then shifted to a different position for producing similar points 11 and 12 in a straight line 13, intersecting the line 8 at the point where the foreign object is located, these points being marked upon the body in the same manner as previously described for the points 9 and 10. This means for establishing two intersecting lines intersecting each other at the point where the foreign object is located is believed to be well understood, and with the exception of marking the surface of the body where these imaginary intersecting lines meet the surface of said body I do not lay any claim for the mechanism for establishing said points, as my invention is only used after these points have been established.

The invention consists, essentially, of a frame A, having a plurality of contact-points $a$, arranged in intersecting lines, an additional contact-point $a'$, movable toward and away from the point of intersection of said lines, and a graduated index $b$, coacting with an indicator $b'$ for indicating the position of the point $a'$ relative to the plane of the points $a$.

The frame A may be of any desired form or material and preferably consists of intersecting bars 14 and 15, lapped one upon the other at their point of intersection and provided with alined apertures 16 and 17 for receiving a suitable pivotal sleeve 18, upon which said arms 14 and 15 are pivoted at their points of intersection and are adapted to be moved upon each other at any desired angle. This sleeve 18 is provided with a threaded aperture 19 and with an annular flange 20, to which is secured an arm 21, which supports an upright arm 22, having a graduated index $b$.

The contact-points $a$ are preferably formed upon the lower ends of suitable arms 23, which are adjustably mounted upon each of the bars 14 and 15 at opposite sides of their point of intersection. These arms may be of any desired length and are preferably provided with suitable heads having spring clamping-jaws 24, adapted to frictionally engage their respective bars 14 or 15 for frictionally holding the arms 23 and their points $a$ in their relative adjusted positions.

When my device is placed in operative position, the arms 23 are moved to such position that their respective contact-points $a$ are registered with the marks 9 and 10, 11 and 12 upon the surface of the body 1. The contact-point $a'$ is adapted to engage the surface of the body in direct alinement with the foreign substance 2 and usually consists of the lower end of a suitable screw 26, movable in the threaded aperture 19 of the sleeve 18, its upper end being provided with the indicator $b'$, which preferably consists of a circular disk held in position by a clamping-nut 27 and a shoulder 28 on the upper end of the screw 26.

The means for holding the arms 14 and 15 in their relative positions preferably consists of a lock-nut 29, engaged with peripheral threads of the upper end of the sleeve 19, the intersecting portions of the arms 14 and 15 being interposed between the lower face of the nut 29 and the upper face of the shoulder 20, or rather of the arm 21, which encircles the lower end of the sleeve 18 between the lower arm 15 and the shoulder 20, said arm 21 being secured to the flange 20 by a suitable screw or other fastening means 30.

It is evident from the foregoing description that the marks 9, 10, 11, and 12 upon the surface of the body being located in intersecting straight lines through the foreign object or substance said points and foreign object all lie in the same plane, and that when my improved apparatus is placed in position upon the body the contact-points $a$ are registered with the marks 9, 10, 11, and 12 and are therefore also disposed in the same plane with the foreign object 2, and that when the device is in this position, with the points $a$ of the several arms 23 in contact with the marks 9, 10, 11, and 12, the screw 26, which passes vertically through the intersection of said bars 14 and 15, points directly toward the foreign object, and by adjusting the screw 26 so that the point $a'$ is in contact with the surface of the body when the points $a$ are also in contact with the marks 9, 10, 11, and 12 the exact depth of the foreign body beneath the surface at the point $a'$ will be indicated upon the index $b$, which may be graduated to inches or centimeters, as desired.

The operation of my invention will now be readily understood upon reference to the foregoing description and the accompanying drawings, and it will be noted that some change may be made in the detail construction and arrangement of the parts of my invention without departing from the spirit thereof. Therefore I do not limit myself to such precise construction as is shown and described.

Having thus described my invention, what I claim, and desire to secure by Letters Patent, is—

1. An apparatus for locating foreign substances in bodies, comprising a frame having a plurality of contact-points arranged in pairs in lines intersecting between the points, and an additional contact-point movable toward and away from the point of intersection of said lines for the purpose described.

2. An apparatus for locating foreign substances in bodies, comprising a frame having a plurality of contact-points arranged in pairs in lines intersecting between the points, a graduated index and a stem movable lengthwise of the index and provided with a contact-point movable toward and away from the point of intersection of said lines.

3. In an apparatus for locating foreign substances in bodies, the combination with intersecting frame-bars, contact-points adjustably mounted on the bars at opposite sides of their point of intersection, and a stem adjustably mounted on the bars and provided with a contact-point movable toward and away from the point of intersection of the bars.

4. An apparatus for locating foreign substances in bodies, comprising intersecting frame-bars having an adjustable contact-point at the intersection and additional points adjustable lengthwise of the bars at opposite sides of the intersection for the purpose set forth.

5. An apparatus for locating foreign substances in bodies comprising intersecting frame-bars pivoted to each other at their point of intersection and having an adjusting-screw coincident with the axis of the pivot and contact-points mounted on the arms at opposite sides of the pivot.

6. An apparatus for locating foreign substances in bodies comprising intersecting frame-bars pivoted to each other at their points of intersection and having an adjusting-screw coincident with the axis of the pivot, fingers having their upper ends provided with spring-jaws frictionally engaged with the arms or bars at the opposite sides of their pivots and their lower ends provided with contact-points for the purpose described.

7. An apparatus for locating foreign substances in bodies comprising intersecting frame-bars having apertures at their intersection, a sleeve inserted in the apertures and forming a pivot for said bars, said sleeve being provided with an engaging shoulder beneath the bars, a lock-nut engaged with the sleeve for holding said bars in position, a screw movable in the sleeve and having its lower end provided with the contact-point and its upper end provided with an annular disk indicator, an additional arm secured to the sleeve and provided with an upright rod having graduations thereon, fingers having their upper ends provided with spring-jaws frictionally engaged with the intersecting arms and movable toward and away from the intersection of said arms and their lower ends provided with contact-points for the purpose described.

In witness whereof I have hereunto set my hand this 25th day of January, 1901.

WILLIAM H. JAKWAY.

Witnesses:
MILDRED M. NOTT,
HOWARD P. DENISON.